United States Patent
Horie

[11] Patent Number: 6,020,968
[45] Date of Patent: Feb. 1, 2000

[54] METHOD OF AND APPARATUS FOR INSPECTING RESIDUE OF METAL FILM

[75] Inventor: Masahiro Horie, Kyoto, Japan

[73] Assignee: Dainippon Screen Mfg. Co., Ltd., Kyoto, Japan

[21] Appl. No.: 09/304,541

[22] Filed: May 4, 1999

[30] Foreign Application Priority Data

May 19, 1998 [JP] Japan ............................... P10-136786

[51] Int. Cl.⁷ .................................................. G01B 11/06
[52] U.S. Cl. ............................................................ 356/382
[58] Field of Search ..................... 356/381, 382, 356/328; 250/557.27; 438/16, 692, 8, 693

[56] References Cited

U.S. PATENT DOCUMENTS

| | | | |
|---|---|---|---|
| 4,645,349 | 2/1987 | Tabata | 356/382 |
| 4,707,611 | 11/1987 | Southwell | 356/382 |
| 4,787,749 | 11/1988 | Ban et al. | 356/382 |
| 4,909,631 | 3/1990 | Tan et al. | 356/382 |
| 4,999,508 | 3/1991 | Hyakumura | 356/382 |
| 4,999,509 | 3/1991 | Wada et al. | 356/381 |
| 5,101,111 | 3/1992 | Kondo | 356/382 |
| 5,493,401 | 2/1996 | Horie et al. | 356/382 |
| 5,686,993 | 11/1997 | Kokubo et al. | 356/381 |
| 5,835,225 | 11/1998 | Thakur | 356/381 |
| 5,883,720 | 3/1999 | Akiyama et al. | 356/382 |

*Primary Examiner*—Hoa Q. Pham
*Attorney, Agent, or Firm*—McDermott, Will & Emery

[57] ABSTRACT

A maximum value of a spectral reflectance at each wavelength with changes in the thickness of a top layer of a multi-layer dielectric film is determined as a maximum reflectance represented by a curve (MLmax) in a graph. In the presence of a residual metal film on the multi-layer dielectric film, the spectral reflectance changes from a curve (A50) to a curve (A5) in the graph with the decrease in the thickness of the residual metal film. In the absence of the residual metal film, the spectral reflectance is represented by a curve (A0) in the graph. Based on the foregoing, a peak wavelength at which the spectral reflectance of a multi-layer film to be judged reaches a peak is determined in a specified wavelength range. When the reflectance of the multi-layer film to be inspected at the peak wavelength is greater than the maximum reflectance, it is concluded that the multi-layer film to be inspected has the residual metal film. When the reflectance of the multi-layer film to be inspected at the peak wavelength is equal to or less than the maximum reflectance, it is concluded that the residual metal film is absent. The presence or absence of the residual metal film on the multi-layer dielectric film is inspected using simple calculation without the need for optical constants of metal.

12 Claims, 8 Drawing Sheets

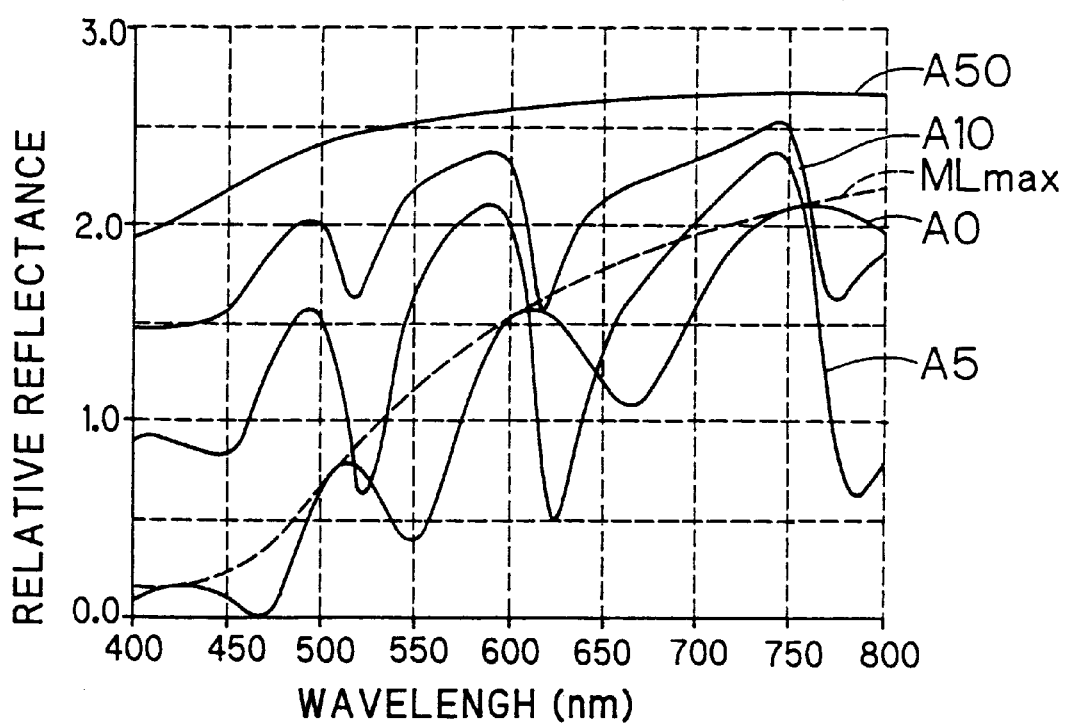
F I G . 4

METHOD OF AND APPARATUS FOR INSPECTING RESIDUE OF METAL FILM

BACKGROUND OF THE INVENTION

1. Field of the Invention

The present invention relates to a method of inspecting the presence or absence of a residual metal film on an optically transparent multi-layer dielectric film and the degree to which the residual metal film remains, and the like. The present invention pertains to the field of optical film thickness measurement techniques.

2. Description of the Background Art

The process step of polishing a metal layer formed on a multi-layer dielectric film of a semiconductor wafer by the chemical mechanical polishing (abbreviated hereinafter as "CMP") process includes measuring and controlling the thickness of a dielectric layer (a top layer of the multi-layer dielectric film) underlying the metal layer after the metal layer is removed by the CMP process. Such film thickness control is performed, for example, when a wiring pattern is formed on the semiconductor wafer by the Damascene technique. Insufficient polishing of the metal layer by the CMP process leaves a residual metal film on the dielectric layer.

The film structure of the multi-layer film must be previously known for measurement of the thickness of each layer of the multi-layer film. Since the film structure differs depending on whether the residual metal film is present or absent, a precondition for the film thickness control after the CMP process is the detection of the presence or absence of the residual metal film. For the detection or evaluation of the degree to which the residual metal film remains on the precondition that the residual metal film is present, it is necessary to previously determine optical constants of metal required to measure the film thickness, such as a refractive index and an absorption coefficient.

SUMMARY OF THE INVENTION

The present invention is intended for a method of inspecting residue of a metal layer on a dielectric film, the dielectric film having optically transparent multi-layers. According to the present invention, the method comprises the steps of: a) obtaining a reference characteristic $Rmax(\lambda)$ depending on wavelength $\lambda$, wherein the reference characteristic $Rmax(\lambda)$ represents a maximum value among spectral reflectance of reference structures at each wavelength $\lambda$, and the reference structures have multi-layer structures corresponding to the dielectric film and have respective top layers of different thickness, b) measuring a spectral reflectance $Rmeas(\lambda)$ of an object sample to be inspected; c) determining a peak value $Rmeas(\lambda 0)$ of the spectral reflectance $Rmeas(\lambda)$ within a predetermined wavelength range together with a peak wavelength $\lambda 0$ providing the peak value $Rmeas(\lambda 0)$; and d) comparing the peak value $Rmeas(\lambda 0)$ with the reference characteristic $Rmax(\lambda 0)$ at the peak wavelength $\lambda 0$, to thereby determine residue of the metal layer.

Preferably, the step d) comprises the step of: concluding that the metal layer substantially remains on the dielectric film when the peak value $Rmeas(\lambda 0)$ is larger than the reference characteristic $Rmax(\lambda 0)$ at the peak wavelength $\lambda 0$.

Therefore, whether the metal layer substantially remains or not may be concluded using simple calculation without the need to determine the optical constants of metal.

Preferably, the step d) comprises the step of determining a ratio of the peak value $Rmeas(\lambda 0)$ and the reference characteristic $Rmax(\lambda 0)$ at the peak wavelength $\lambda 0$, to evaluate the metal layer remaining on the dielectric film.

Therefore, the degree to which the residual film remains may be inspected using simple calculation without the need to determine the optical constants of metal.

Preferably, the step d) comprises the steps of: obtaining a spectral reflectance $Rmetal(\lambda)$ of the metal layer; obtaining a first value $E(\lambda 0)$ which is in proportion to logarithm of a first ratio of the spectral reflectance $Rmeas(\lambda 0)$ of the dielectric film and the spectral reflectance $Rmetal(\lambda 0)$ at the peak wavelength $\lambda 0$; obtaining a second value $Emax(\lambda 0)$ which is in proportion to logarithm of a second ratio of the spectral reflectance $Rmax(\lambda 0)$ of the dielectric film and the spectral reflectance $Rmetal(\lambda 0)$ of the metal layer at the peak wavelength $\lambda 0$; and obtaining a third ratio of the first value $E(\lambda 0)$ and the second value $Emax(\lambda 0)$ to evaluate the metal layer remaining on the dielectric film.

The third ratio in accordance with the degree to which the residual film remains may be determined from the maximum reflectance and the measured reflectance by using the metal reflectance as a reference.

The multi-layer dielectric film may be replaced with a single-layer film. The peak wavelength may include not only the wavelength which maximizes the measured reflectance alone but also the wavelength which relatively maximizes the difference between the measured reflectance and the maximum reflectance or the ratio of the measured reflectance to the maximum reflectance.

The peak wavelength may be determined as the wavelength which maximizes the measured reflectance by using the metal reflectance as a reference. The step of or means for determining the peak wavelength may be included in the step of or means for determining the residual film index.

The measured reflectance which is equal to the maximum reflectance includes the measured reflectance which is regarded as being equal to the maximum reflectance. The relationship in quantity between the measured reflectance and the maximum reflectance relative to each other includes the ratio of the measured reflectance to the maximum reflectance, and the difference therebetween.

It is therefore an object of the present invention to inspect a residual metal film which is capable of inspecting the presence or absence of the residual film and the degree to which the residual film remains by using simple calculation without the need to previously determine optical constants of metal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a graph showing changes in spectral reflectance with changes in thickness of an Al wiring layer overlying the multi-layer dielectric film of FIG. 2;

DESCRIPTION OF THE PREFERRED EMBODIMENTS

1. Apparatus Construction

Figure 1:
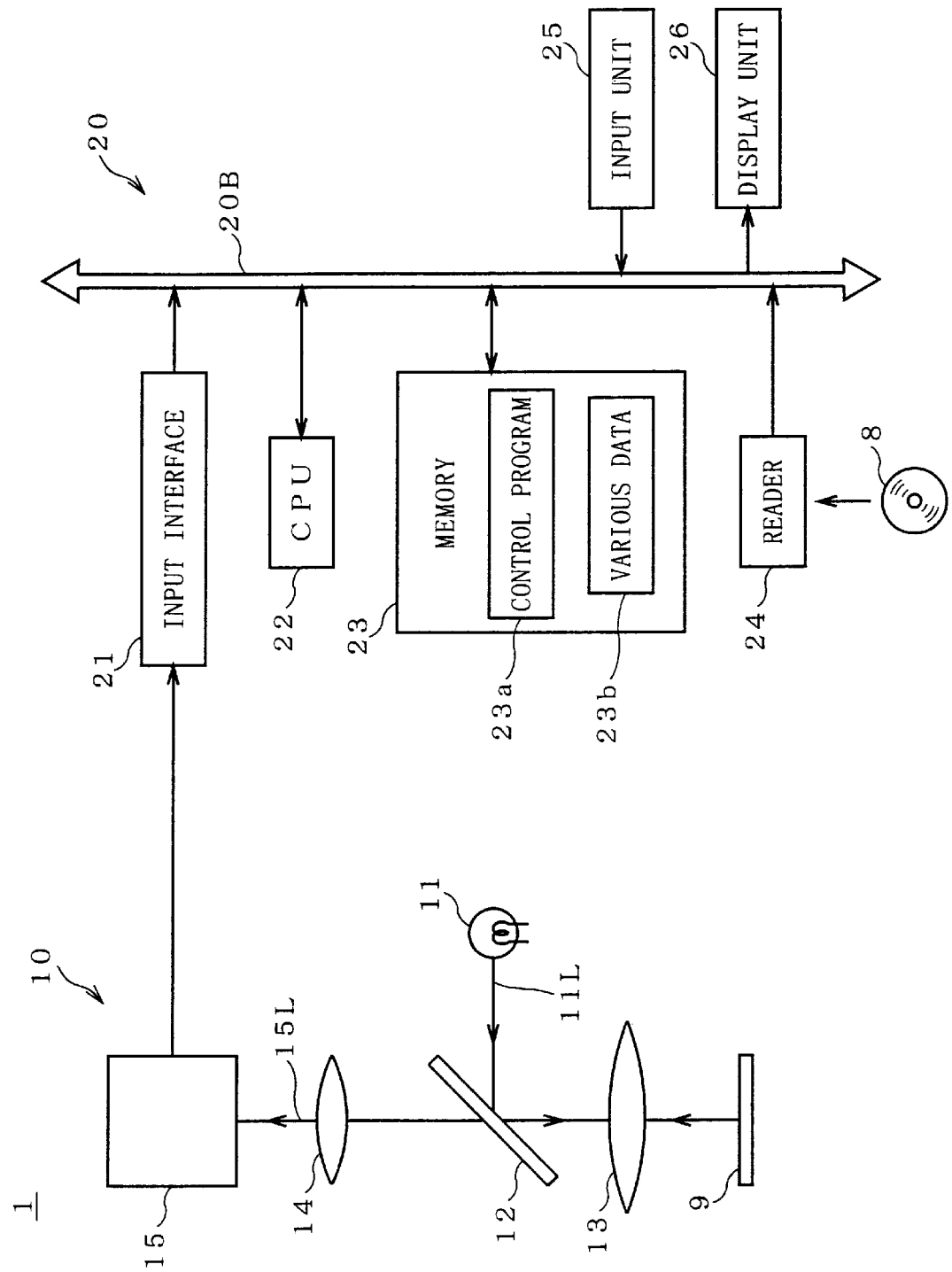
FIG. 1 shows the construction of a residual metal film inspecting apparatus according to the present invention.

FIG. 1 shows the construction of a residual metal film inspecting apparatus 1 for inspecting the presence or absence of a residual metal film in a multi-layer film formed on a substrate 9 and the degree to which the residual metal film remains. The residual metal film inspecting apparatus 1 comprises a measuring section 10 for detecting light reflected from the substrate 9, and a processing section 20 for inspection about the residual metal film based on the result of light detection from the measuring section 10.

The measuring section 10 includes: a light source 11, such as a lamp, for emitting light 11L for illuminating the substrate 9; a half mirror 12 for reflecting the light 11L from the light source 11; an objective lens 13 for directing the light 11L reflected from the half mirror 12 onto the substrate 9; a lens 14 cooperating with the objective lens 13 to direct the light 15L reflected from the substrate 9 into a predetermined light detection position; and a spectroscope 15 for separating the reflected light 15L based on wavelength and then detecting the reflected light 15L to output the intensity of the reflected light 15L for each wavelength in the form of an electric signal.

The illuminating light 11L is directed through the half mirror 12 and the objective lens 13 onto the substrate 9. The reflected light 15L is directed through the objective lens 13, the half mirror 12 and the lens 14 in order into the spectroscope 15.

The processing section 20 has a construction utilizing a conventional computer system (hereinafter referred to simply as a "computer"), and includes: an input interface 21 for receiving the signal from the measuring section 10; a CPU 22 for executing various computing instructions; a memory 23 for storing a control program 23a which causes the CPU 22 to execute inspecting processing and the like; a reader 24 for reading various data and programs from a recording medium 8 into the processing section 20; an input unit 25, such as a keyboard and a mouse, for accepting an input from an operator; and a display unit 26, such as a display, for displaying various information to an operator, all of which are connected to a bus line 20B, with an interface connected therebetween as required.

With such an arrangement, the residual metal film inspecting apparatus 1 is adapted such that the measuring section 10 obtains a spectral reflectance, i.e. a reflectance for each wavelength, of the substrate 9, and the processing section 20 performs a computation on the obtained spectral reflectance to judge the presence or absence of the residual metal film in the multi-layer film formed on the substrate 9 and the degree to which the residual metal film remains.

It should be noted that the measuring section 10 may be of any construction which is capable of detecting the spectral reflectance of the substrate 9, and the processing section 20 need not have the construction utilizing the computer but may be constructed of a purpose-built electric circuit.

Additionally, the bus line 20B may be connected to a fixed disk and the like as required. Further, the recording medium 8 may be any type of recording medium such as a magnetic disk, an optical disk and a magneto-optical disk.

2. Principle of Residual Film Inspection

Description will now be given on the principle on which a method of judging the residual metal film performed by the residual metal film inspecting apparatus 1 can judge the presence or absence of the residual metal film and the like.

Figure 2:
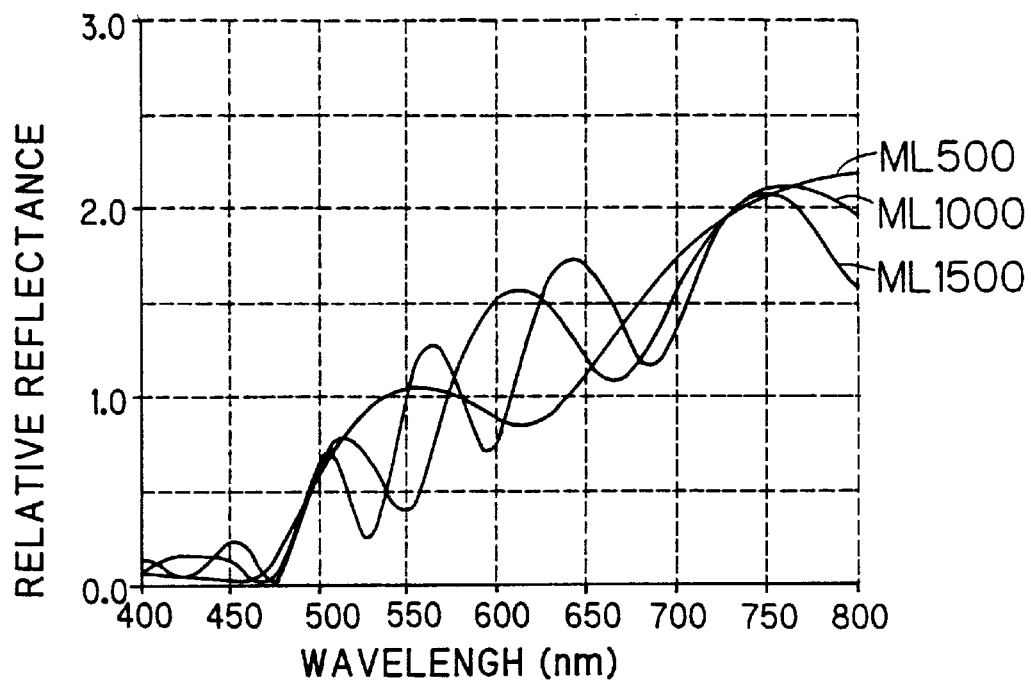
FIG. 2 is a graph showing an example of changes in spectral reflectance with changes in thickness of a top layer of a multi-layer dielectric film.
Figure 10A:
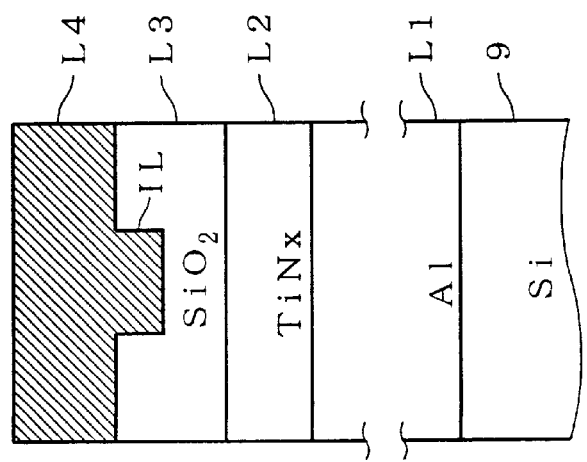
FIGS. 10A through 10C show the structure of the multi-layer film.
Figure 10B:
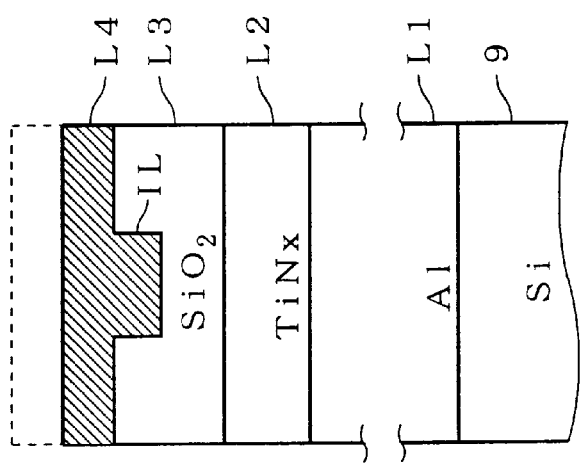
Figure 10C:
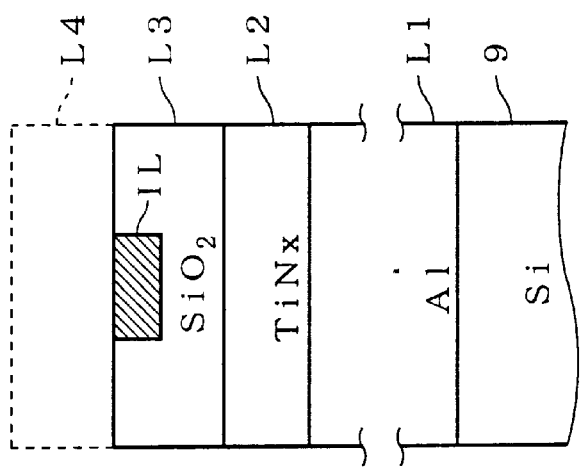

FIGS. 10A to 10C show the structure of the multi-layer film formed on the substrate 9. The multi-layer film includes an aluminum layer (Al film L1), a titanium nitride film (TiNx film L2) formed atop the Al film, an oxide film (SiO$_2$ film L3) formed atop the TiNx film, and a wiring layer for aluminum interconnection (referred to hereinafter as an "Al wiring layer L4") formed atop the SiO$_2$ film, all of which are arranged in stacked relation. The Al film shall be sufficiently thick and opaque, and the TiNx film and the SiO$_2$ film constitute an optically transparent multi-layer dielectric film. As the CMP process is performed in the state shown in FIG. 10A, the Al wiring layer L4 is gradually removed as illustrated in FIG. 10B. Finally, when the Al wiring layer L4 is completely removed, an Al interconnect line is formed in a recess of the SiO$_2$ film L3. FIG. 2 shows the spectral reflectance of the multi-layer film formed on the substrate 9 which is a silicon substrate (Si substrate). In the graph of FIG. 2, wavelength is measured along the horizontal axis, and reflectance relative to the Si substrate is measured along the vertical axis. The same is true for other graphs to be illustrated later. The relative spectral reflectance is referred to simply as a "spectral reflectance" hereinafter.

In FIG. 2, the curve labeled ML500 represents the spectral reflectance when the SiO$_2$ film having a thickness of 500 nm is formed on the TiNx film having a thickness of 30 nm, the curve labeled ML1000 represents the spectral reflectance when the SiO$_2$ film having a thickness of 1000 nm is formed on the 30 nm thick TiNx film, and the curve labeled ML1500 represents the spectral reflectance when the SiO$_2$ film having a thickness of 1500 nm is formed on the 30 nm thick TiNx film.

Figure 3:
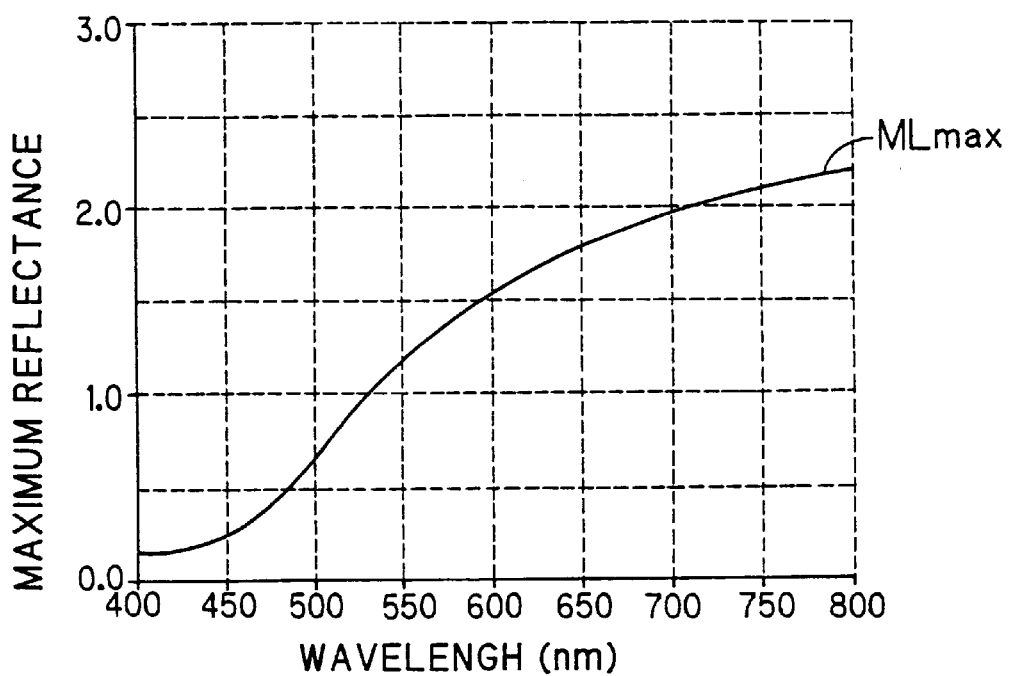
FIG. 3 is a graph showing a maximum reflectance of the multi-layer dielectric film of FIG. 2.

The curve labeled MLmax in the graph of FIG. 3 represents the reflectance which is maximized (referred to hereinafter as a "maximum reflectance") for each wavelength when the thickness of the SiO$_2$ film of FIG. 2 is continuously increased from 500 nm to 1500 nm. In other words, the curve labeled MLmax in the graph of FIG. 3 represents an envelope obtained where the reflectance is maximized when the curves of FIG. 2 continuously change.

Description will now be given on the relationship between the maximum reflectance of FIG. 3 and the spectral reflectance obtained when a wiring layer for aluminum interconnection is formed on the optically transparent multi-layer dielectric film having the spectral reflectance shown in FIG. 2.

FIG. 4 is a graph showing the spectral reflectance when the Al film, the TiNx film having a thickness of 30 nm, the SiO$_2$ film having a thickness of 1000 nm, and the Al wiring layer are arranged in stacked relation in the order named. In FIG. 4, the curve labeled A0 (corresponding to the curve labeled ML1000 in FIG. 2) represents the spectral reflectance in the absence of the Al wiring layer, and the curves labeled A5, A10 and A50 represent the spectral reflectance when the Al wiring layer is 5 nm, 10 nm and 50 nm in thickness, respectively. The curve labeled MLmax representing the maximum reflectance with changes in the thickness of the SiO$_2$ film on the assumption that the Al wiring layer is absent is also illustrated in FIG. 4.

The instance of FIG. 4 shows the course of the removal of the Al wiring layer by the CMP process, and an Al interconnect line IL is formed in a recess of the underlying SiO$_2$ film at the time the Al wiring layer is removed. The Al wiring layer is removed from a protrusion (relative to the recess) of the SiO$_2$ film.

The curve labeled A50 substantially shows the spectral reflectance of aluminum since the Al wiring layer is thick enough to be optically opaque. As the thickness of the Al wiring layer decreases, the Al wiring layer allows a greater amount of light to pass therethrough, and interference of light consequently occurs in a region including the Al wiring layer and the underlying optically transparent multi-layer dielectric film to provide the spectral reflectance curve having complicated interference waveforms. Accurate determination of the thickness of the residual metal film which is the remainder of the Al wiring layer based on these interference waveforms has required the determination of optical constants (a refractive index and an absorption coefficient required to measure the film thickness) of aluminum which is metal. The present invention is intended for inspecting the presence or absence of the residual metal film and the like without using such optical constants.

With reference to FIG. 4, the curve A0 representing the spectral reflectance when the Al wiring layer is completely removed contacts the curve MLmax representing the maximum reflectance at a wavelength at which the curve A0 has a peak or a maximum value (referred to hereinafter as a "peak wavelength"). The peak wavelength may have a value around the peak. Specifically, as the sufficiently thick Al wiring layer is polished to decrease in thickness, the peaks of the curves representing the spectral reflectance decrease gradually down to the curve MLmax representing the maximum reflectance. The peak of the curve representing the spectral reflectance of the optically transparent multi-layer dielectric film contacts the curve MLmax representing the maximum reflectance even if the SiO$_2$ film underlying the Al wiring layer is somewhat cut away due to over-polishing.

Thus, when the peak is detected in a wavelength range (specified for inspection about the presence or absence of the residual metal film to be described layer and the like and referred to hereinafter as a "specified wavelength range") including the peak in the presence of the residual film of the Al wiring layer, the reflectance at the peak wavelength always exceeds the maximum reflectance at the peak wavelength. When the peak is detected in the specified wavelength range in the absence of the residual film of the Al wiring layer, the peak is positioned on the curve representing the maximum reflectance. In some cases, the reflectance is less than the maximum reflectance at a wavelength other than the peak wavelength even in the presence of the residual metal film. This results from the influence of interference of light as described above.

As shown in FIG. 4, the peak wavelength (See the peaks around a wavelength of 750 nm) is not necessarily fixed. Therefore, the peak wavelength should be determined again in accordance with the thickness of the residual metal film. Such a phenomenon results from the fact that an optical path length varies depending on the thickness of the residual metal film.

The optical characteristics that the peak wavelength differs depending on the thickness of the Al wiring layer but the reflectance at the peak wavelength exceeds the maximum reflectance hold true in general for a multi-layer film including a residual metal film serving as a top layer and an optically transparent multi-layer (including single-layer) dielectric film formed thereunder. Specifically, the residual metal film may be a film of metal material used for a wiring layer, such as copper (Cu), tungsten (W) and gold (Au), in addition to aluminum. The optically transparent multi-layer dielectric film may be a film of the oxide and nitride of semiconductor and metal.

In summary, the peak wavelength is first determined in the specified wavelength range for the multi-layer film to be inspected. If the reflectance of the multi-layer film to be inspected at the peak wavelength is equal to or less than the maximum reflectance, it is judged that the residual metal film is absent. If the reflectance of the multi-layer film to be inspected at the peak wavelength is greater than the maximum reflectance, it is concluded that the residual metal film is present. Further, the degree to which the residual metal film remains may be inspected by comparing the reflectance of the multi-layer film to be inspected at the peak wavelength with the maximum reflectance. The present invention uses such characteristics of the reflectance of the multi-layer film in the course of the removal of the metal layer as the principle of the inspection about the residual film, and accomplishes the inspection about the presence or absence of the residual metal film and the degree to which the residual metal film remains by using simple calculation without the need for the optical constants of metal required to measure the film thickness.

3. Residual Film Inspecting Operation

Figure 5:
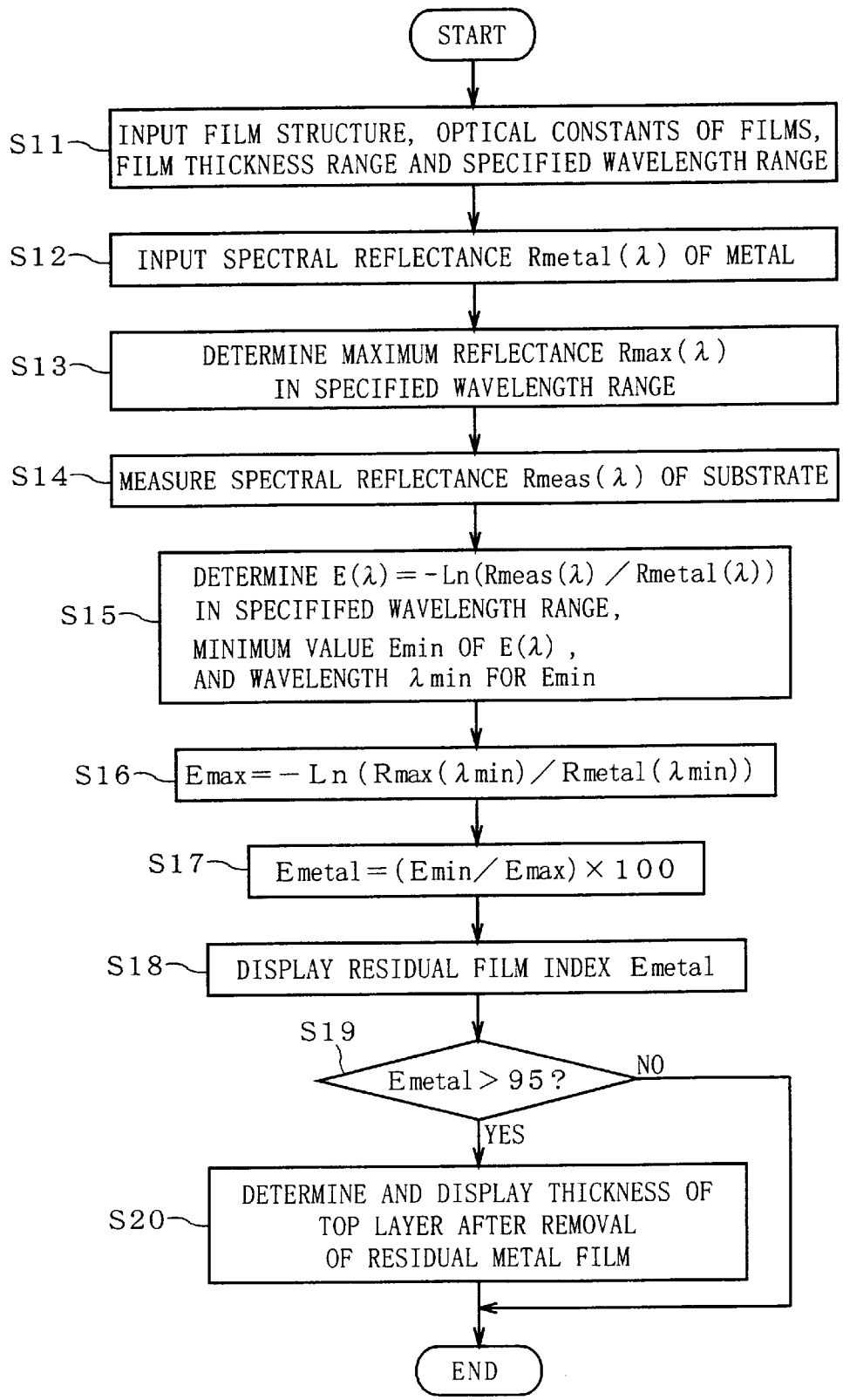
FIG. 5 is a flow diagram showing an operation flow of the apparatus.

FIG. 5 is a flow diagram showing the operation of the residual metal film inspecting apparatus 1. The residual metal film inspecting apparatus 1 displays the degree to which the residual metal film remains as an index of the residual film in addition to inspecting the presence or absence of the residual metal film. Additionally, when it is concluded that the residual metal film has been removed, the residual metal film inspecting apparatus 1 determines the thickness of the top layer of the multi-layer film (multi-layer dielectric film) after the removal of the residual film. Such operations of the residual metal film inspecting apparatus 1 are implemented by the CPU 22 executing instructions in accordance with the control program 23a stored in the memory 23 shown in FIG. 1. In other words, the means for executing computing processing to be described below are designed around the CPU 22 and the memory 23.

The following description takes as an example the operation of inspecting the residual metal film when the Al wiring layer is polished and removed by the CMP process from the multi-layer film including the SiO$_2$ film formed on the silicon substrate 9 and the Al wiring layer formed on the SiO$_2$ film.

Referring to FIG. 5, inputted from the input unit 25 are a film structure regarding parts other than the Al wiring layer, the optical constants of the respective layers of the multi-layer film, an assumed or expected range of the thickness of a dielectric layer (a top layer of the multi-layer dielectric film) underlying the Al wiring layer, and the thickness of other dielectric layers (Step S11). The expected range is a thickness range which is expected to cover the thickness of the top layer. These data are used for calculation of the maximum reflectance and the measurement of the film thickness after the inspection about the residual film. A wavelength range assumed to include the peak of the spectral reflectance of the multi-layer film to be inspected is also previously inputted as the specified wavelength range (Step S11). The various data 23b inputted are stored in the memory 23 and become processable by the CPU 22.

Next, the spectral reflectance Rmetal($\lambda$) of the metal forming the Al wiring layer, i.e. aluminum, is inputted from the input unit 25 or read from the fixed disk and the like and is then stored in the memory 23 (Step S12). The spectral reflectance of metal which is previously measured, logically calculated, or documented in literature may be used herein. The spectral reflectance of metal (referred to hereinafter as a "metal reflectance") is used as a reference for determining the residual film index, and is not always required when other data are used as the reference.

After the preparation in Steps S11 and S12, the maximum reflectance or a reference characteristic $Rmax(\lambda)$ is theoretically determined which is a maximum value at each wavelength of the spectral reflectance of the multi-layer dielectric film in the absence of the metal layer in the specified wavelength range when the thickness of the top dielectric layer is changed within the expected thickness range (Step S13).

Figure 6:
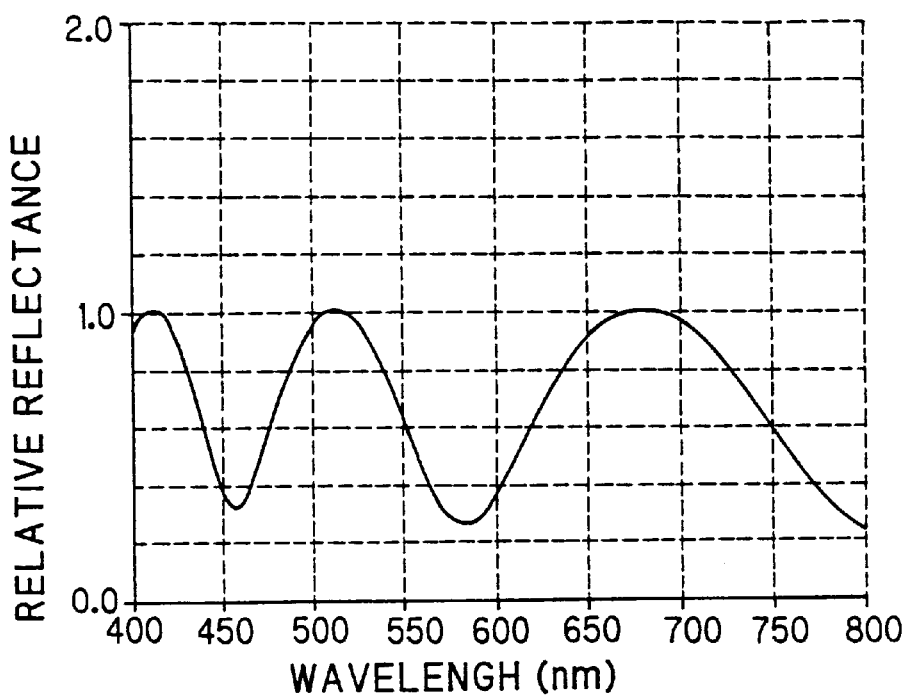
FIG. 6 is a graph showing an example of the spectral reflectance of an $SiO_2$ film overlying an Si substrate.
Figure 7:
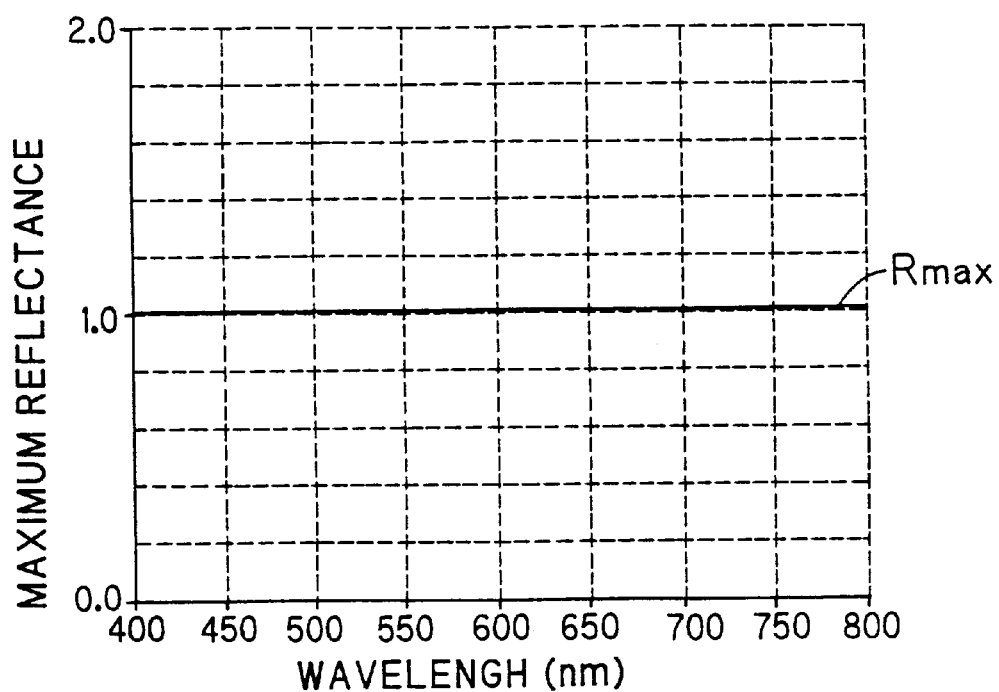
FIG. 7 is a graph showing an example of the maximum reflectance of the SiO$_2$ film overlying the Si substrate.

FIG. 6 is a graph illustrating a relative spectral reflectance (similar to that of FIG. 2 and indicating the spectral reflectance relative to the spectral reflectance of the Si substrate) when the $SiO_2$ film having a thickness of 700 nm is formed on the Si substrate. When the thickness of the $SiO_2$ film on the Si substrate is changed, the peak is shifted in the direction of the horizontal axis but the reflectance at the peak is held at 1.0. Thus, the maximum reflectance in the case of this film structure is represented by a straight line extending in the direction of the horizontal axis as shown in FIG. 7.

Such a maximum reflectance $Rmax(\lambda)$ need not be computed but may be prepared in predetermined storage means in the form of a table.

Figure 8:
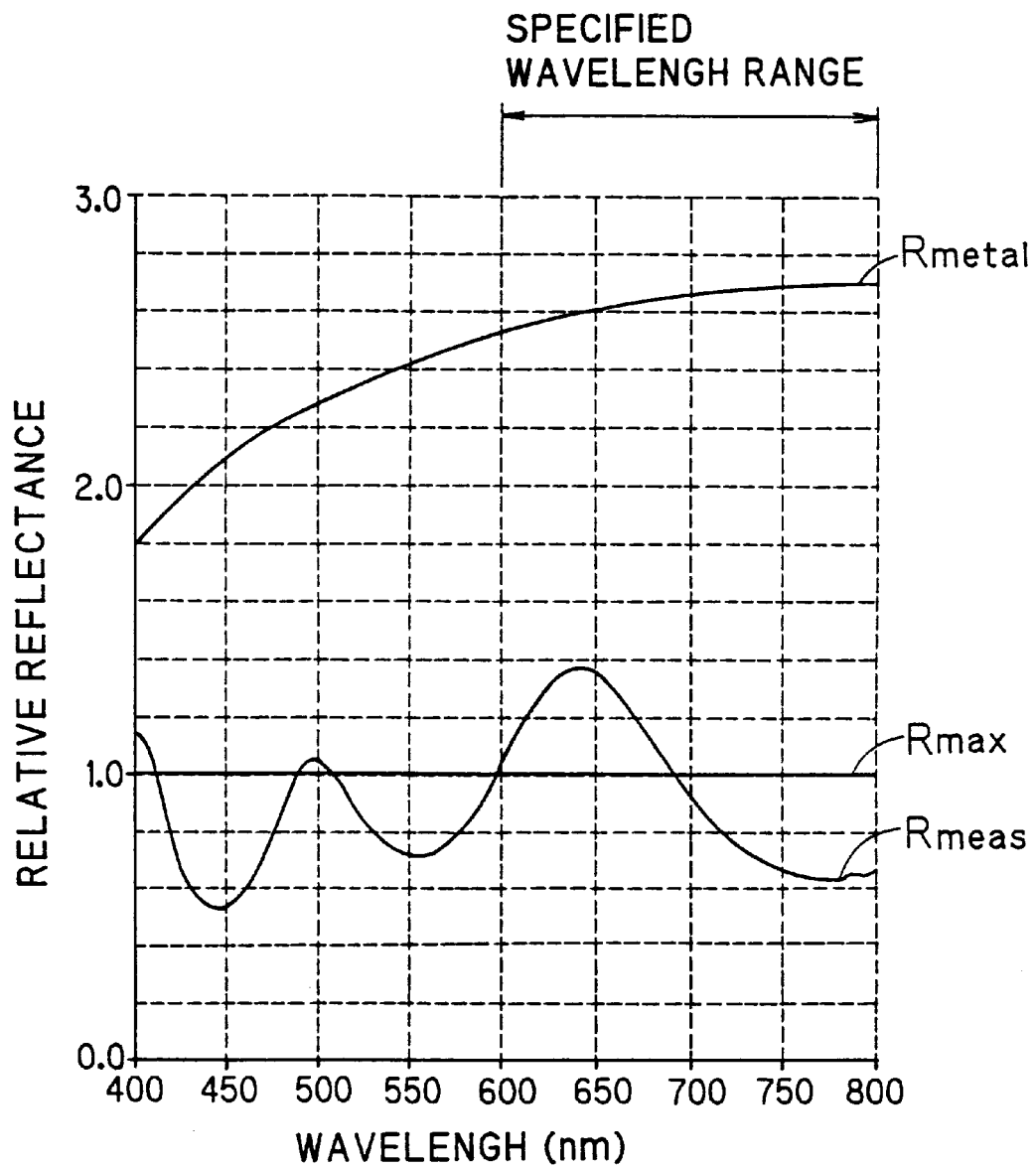
FIG. 8 is a graph illustrating the spectral reflectance of aluminum, the maximum reflectance of the SiO$_2$ film and the spectral reflectance of a multi-layer film to be inspected.

Next, the measuring section 10 obtains the spectral reflectance $Rmeas(\lambda)$ of the substrate 9 having the multi-layer film to be judged. The spectral reflectance $Rmeas(\lambda)$ is inputted through the input interface 21 to the processing section 20 (Step S14). FIG. 8 shows the metal reflectance $Rmetal(\lambda)$, the maximum reflectance $Rmax(\lambda)$ and the measured spectral reflectance (referred to hereinafter as a "measured reflectance") $Rmeas(\lambda)$ using the same coordinate axis. Specifically, when the residual metal film is sufficiently thick, the spectral reflectance of the substrate 9 is obtained in the same state as the metal reflectance $Rmetal(\lambda)$. When the residual metal film has been completely removed, the spectral reflectance of the substrate 9 is obtained in such a state that the peak of the measured reflectance $Rmeas(\lambda)$ is in contact with the maximum reflectance $Rmax(\lambda)$. Therefore, the measured reflectance $Rmeas(\lambda)$ shown in FIG. 8 indicates that the residual metal film remains thin.

Next performed is the process of determining as the residual film index how much the reflectance at the peak of the measured reflectance $Rmeas(\lambda)$ differs from the metal reflectance $Rmetal(\lambda)$ as compared with the maximum reflectance $Rmax(\lambda)$.

First, $E(\lambda)$ is determined in the specified wavelength range (assuming that the specified wavelength range is specified as 600 to 800 nm).

$$E(\lambda) = -\text{Ln}\left(\frac{Rmeas(\lambda)}{Rmetal(\lambda)}\right) \quad (1)$$

Then, a minimum value Emin of $E(\lambda)$ and a wavelength $\lambda$min for the minimum value Emin are determined (Step S15).

Figure 9:
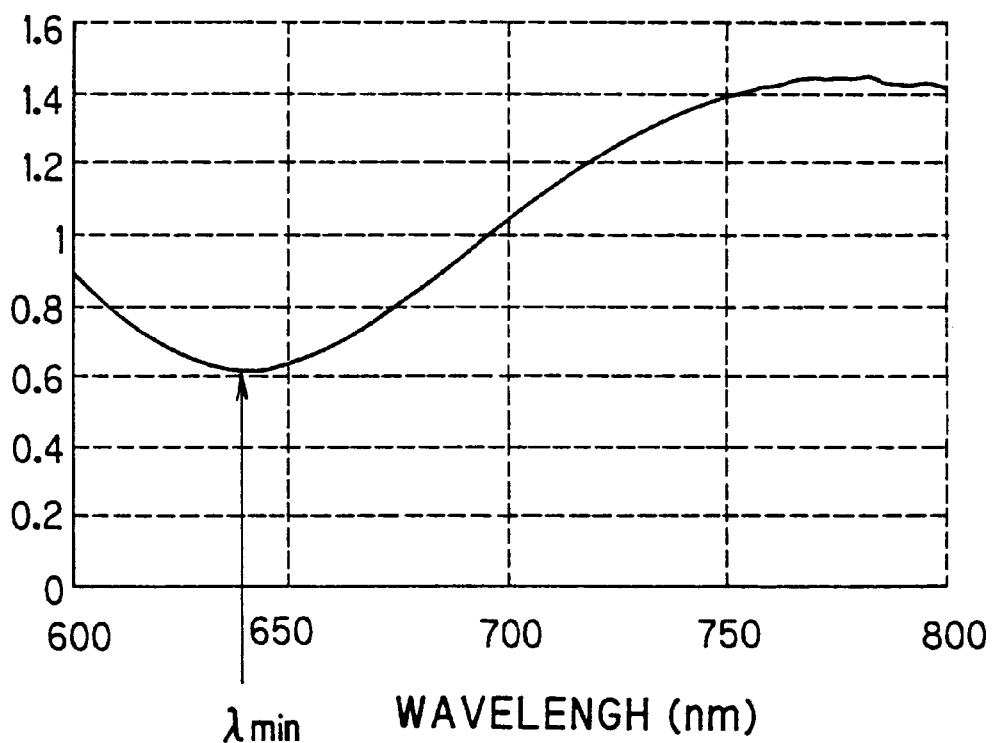
FIG. 9 is a graph showing (−1) multiplied by the natural logarithm of the measured reflectance of FIG. 8 divided by a metal reflectance.

Equation (1) shows the computation which changes the sign of the natural logarithm of the measured reflectance $Rmeas(\lambda)$ divided by the metal reflectance $Rmetal(\lambda)$. Therefore, the greatest ratio of the measured reflectance to the metal reflectance is provided at the wavelength $\lambda$min. In other words, the wavelength $\lambda$min means the peak wavelength which provides the greatest ratio (precisely the greatest maximum value of the ratio; the same shall apply hereinafter) of the measured reflectance $Rmeas(\lambda)$ to the metal reflectance $Rmetal(\lambda)$. FIG. 9 is a graph showing $E(\lambda)$ in the specified wavelength range.

In this operation instance, the metal reflectance $Rmetal(\lambda)$ is used as a reference to determine the peak wavelength which maximizes the measured reflectance $Rmeas(\lambda)$. Alternatively, the peak wavelength may be determined based on only the measured reflectance $Rmeas(\lambda)$ in a manner described with respect to the principle of judgement with reference to FIG. 4. Thus, the process of determining the peak wavelength may be performed independently of the operation for solving Equation (1).

In consideration for the fact that the peak of the measured reflectance $Rmeas(\lambda)$ gradually shifts from the curve representing the metal reflectance $Rmetal(\lambda)$ to the curve representing the maximum reflectance $Rmax(\lambda)$ with the decrease in residual metal film thickness, the reflectance at the peak of the measured reflectance $Rmeas(\lambda)$ may be regarded as a reflectance which is not influenced by interference of light. In general, without significant variations in reference wavelength, (−1) multiplied by the natural logarithm of the reflectance is roughly proportional to film thickness, and Emin given from Equation (1) may be grasped as an equivalent of a value proportional to the difference in thickness between a sufficiently thick film and the residual metal film on the substrate 9.

In the instance shown in FIG. 9, Emin is approximately 0.6 and the peak wavelength $\lambda$min is approximately 640.

Next, Emax is determined by computing Equation (2) (Step S16).

$$Emax = -\text{Ln}\left(\frac{Rmax(\lambda 0)}{Rmetal(\lambda 0)}\right) \quad (2)$$

where $\lambda 0$ generally denotes the peak wavelength. In this preferred embodiment, $\lambda 0=\lambda$min. Equation (2) shows the computation which changes the sign of the natural logarithm of the maximum reflectance $Rmax(\lambda)$ divided by the metal reflectance $Rmetal(\lambda)$ at the peak wavelength $\lambda$min. Thus, Emax given from Equation (2) may be grasped as an equivalent of a value proportional to the difference between the thickness of a sufficiently thick film and a film thickness of zero in the absence of the residual metal film (i.e., proportional to the thickness of the sufficiently thick film).

In the instance shown in FIG. 8, Rmetal(640) is approximately 2.6, and accordingly the result of computation in Equation (2) is 0.956.

Next, a normalized residual film index Emetal is determined (Step S17).

$$Emetal = \frac{Emin}{Emax} \times 100 \quad (3)$$

In Equation (3), the percentage of Emin determined from the measured reflectance $Rmeas(\lambda\text{min})$ based on Emax determined from the maximum reflectance $Rmax(\lambda\text{min})$ is defined as the residual film index Emetal. Since Emin indirectly represents the difference in thickness between the sufficiently thick film and the residual film whereas Emax indirectly represents the thickness of the sufficiently thick film as above described, the percentage of Emin based on Emax may be determined to use the residual film index Emetal as an index indicative of the degree to which the residual film is removed. Therefore, the residual film index Emetal of not less than 100 means the complete removal of the residual film, and the residual film index Emetal of zero means the presence of the residual film left sufficiently. In practice, multiplying by (−1) in Equations (1) and (2) is not necessary because of the presence of the division in Equation (3).

In the instance shown in FIG. 8, the residual film index Emetal of 62.7(%) is obtained by multiplying 100 by the quantity 0.6 divided by 0.956. The display unit 26 displays the residual film index Emetal to an operator (Step S18).

The determined residual film index Emetal is compared with a predetermined threshold value (e.g., 95) (Step S19). When the residual film index Emetal is greater than the threshold value, it is concluded that the residual film has been removed (i.e., that the measured reflectance Rmeas($\lambda$min) is equal to the maximum reflectance Rmax($\lambda$min)). When the residual film index Emetal is less than the threshold value, it is concluded that the residual film has not yet been removed.

When it is judged that the residual film has been removed in Step S19, there is a possibility that the underlying $SiO_2$ film is removed by over-polishing to a reduced thickness. Then, the thickness of the $SiO_2$ film after the removal of the residual film is determined by logical computation from the measured reflectance Rmeas($\lambda$) based on the film structure, the optical constants of the respective layers and the film thickness range which are prepared in Step S11 (Step S20).

As described hereinabove, the residual metal film inspecting apparatus 1 is capable of inspecting the presence or absence of the residual metal film and the degree to which the residual metal film remains without the need to previously determine the optical constants required for film thickness measurement, such as the refractive index and the absorption coefficient of metal. Additionally, the residual metal film inspecting apparatus 1 may determine the degree to which the residual metal film remains as the residual film index to use the residual film index also for the detection of an end point of etching and polishing.

4. Modifications

The construction and operation of the residual metal film inspecting apparatus 1 have been described hereinabove according to the present invention. The present invention, however, is not limited to the above-mentioned preferred embodiment, but may be variously modified.

For example, the above-mentioned preferred embodiment employs as a particular instance the CMP process for the formation of the Al interconnect line, and the specified wavelength range from 600 to 800 nm is used. It is, however, preferred to use the specified wavelength range from 400 to 600 nm for the inspection about the presence or absence of the residual metal film made of copper.

Although the reflectance for wavelength is continuously determined in the spectroscope 15 in the above-mentioned preferred embodiment, the reflectance at the peak wavelength and the peak may be approximately determined using discrete spectral reflectances rather than the continuous spectral data. For example, a plurality of color filters may be used in place of the spectroscope 15 to obtain the spectral reflectances for discrete wavelengths.

Further, the wavelength which provides the greatest ratio of the measured reflectance Rmeas($\lambda$) to the metal reflectance Rmetal($\lambda$) and the wavelength which maximizes the measured reflectance Rmeas($\lambda$) are used as the peak wavelength in the above-mentioned preferred embodiment. Alternatively, the maximum reflectance Rmax($\lambda$) may be used as a reference for determining the peak wavelength. Specifically, the wavelength which provides the greatest difference or ratio between the maximum reflectance Rmax ($\lambda$) and the measured reflectance Rmeas($\lambda$) may be used as the peak wavelength. In this manner, the wavelength at which the measured reflectance Rmeas($\lambda$) has the relatively greatest value may be used as the peak wavelength.

Furthermore, although the metal reflectance Rmetal($\lambda$) is used as a reference to determine the residual film index Emetal in the above-mentioned preferred embodiment, the maximum reflectance Rmax($\lambda$) may be also used as a reference for determining the residual film index Emetal. For example, the ratio between the maximum reflectance Rmax ($\lambda$p) and the measured reflectance Rmeas($\lambda$p) at a peak wavelength $\lambda$p may be used as the residual film index Emetal. In this case, it is concluded that the residual film is absent when the residual film index Emetal equals "1" or falls within a predetermined range in the vicinity of "1." Alternatively, the difference between the measured reflectance Rmeas($\lambda$p) and the maximum reflectance Rmax($\lambda$p) at the peak wavelength $\lambda$p may be used as the residual film index Emetal, in which case it is concluded that the residual film is absent when the residual film index Emetal is not greater than a predetermined threshold value close to "0."

Thus, any method which can determine a relationship in quantity between the measured reflectance Rmeas($\lambda$p) and the maximum reflectance Rmax($\lambda$p) relative to each other may be used to judge the degree to which the residual film remains. When the metal reflectance Rmetal($\lambda$) is not used as a reference, no optical data about the metal are required. For only the judgement about the presence or absence of the residual metal film, it is sufficient to merely determine which is greater by the comparison between the measured reflectance Rmeas($\lambda$p) and the maximum reflectance Rmax($\lambda$p) at the peak wavelength $\lambda$p.

While the invention has been described in detail, the foregoing description is in all aspects illustrative and not restrictive. It is understood that numerous other modifications and variations can be devised without departing from the scope of the invention.

I claim:

1. A method of inspecting residue of a metal layer on a dielectric film, said dielectric film having optically transparent multi-layers, said method comprising the steps of:

a) obtaining a reference characteristic Rmax($\lambda$) depending on wavelength $\lambda$,
      wherein said reference characteristic Rmax($\lambda$) represents a maximum value among spectral reflectance of reference structures at each wavelength $\lambda$, and
      said reference structures have multi-layer structures corresponding to said dielectric film and have respective top layers of different thickness, b) measuring a spectral reflectance Rmeas($\lambda$) of an object sample to be inspected;

c) determining a peak value Rmeas($\lambda$0) of said spectral reflectance Rmeas($\lambda$) within a predetermined wavelength range together with a peak wavelength $\lambda$0 providing said peak value Rmeas($\lambda$0); and d) comparing said peak value Rmeas($\lambda$0) with said reference characteristic Rmax($\lambda$0) at said peak wavelength $\lambda$0, to thereby determine residue of said metal layer.

2. The method according to claim 1,
   wherein the step d) comprises the step of:
      concluding that said metal layer substantially remains on said dielectric film when said peak value Rmeas ($\lambda$0) is larger than said reference characteristic Rmax ($\lambda$0) at said peak wavelength $\lambda$0.

3. The method according to claim 1,
wherein the step d) comprises the step of:
  determining a ratio of said peak value Rmeas($\lambda 0$) and said reference characteristic Rmax($\lambda 0$) at said peak wavelength $\lambda 0$, to evaluate said metal layer remaining on said dielectric film.

4. The method according to claim 1,
wherein the step d) comprises the steps of:
  obtaining a spectral reflectance Rmetal($\lambda$) of said metal layer;
  obtaining a first value E($\lambda 0$) which is in proportion to logarithm of a first ratio of said spectral reflectance Rmeas($\lambda 0$) of said dielectric film and said spectral reflectance Rmetal($\lambda 0$) at said peak wavelength $\lambda 0$;
  obtaining a second value Emax($\lambda 0$) which is in proportion to logarithm of a second ratio of said spectral reflectance Rmax($\lambda 0$) of said dielectric film and said spectral reflectance Rmetal($\lambda 0$) of said metal layer at said peak wavelength $\lambda 0$; and
  obtaining a third ratio of said first value E($\lambda 0$) and said second value Emax($\lambda 0$) to evaluate said metal layer remaining on said dielectric film.

5. The method according to claim 4,
wherein the step d) further comprises:
  a first step of comparing said third ratio with a threshold value to determine whether or not said metal layer substantially remains on said dielectric film;
  a second step of obtaining thickness of a top layer of said optically transparent multi-layers when it is determined that said metal layer substantially remains on said dielectric film; and
  a third step of outputting a value of said thickness of said top layer.

6. The method according to claim 5,
wherein the second step comprises the steps of:
  obtaining an information representing
    i) a structure of said dielectric film,
    ii) optical constants of respective layers of said dielectric film, and
    iii) a thickness range which is expected to cover said thickness of said top layer; and
  calculating said thickness of said top layer in response to said information.

7. An apparatus for inspecting residue of a metal layer on a dielectric film, said dielectric film having optically transparent multi-layers, said apparatus comprising:
  a) means for obtaining a reference characteristic Rmax($\lambda$) depending on wavelength $\lambda$,
    wherein said reference characteristic Rmax($\lambda$) represents a maximum value among spectral reflectance of reference structures at each wavelength $\lambda$, and
    said reference structures have multi-layer structures corresponding to said dielectric film and have respective top layers of different thickness,
  b) means for measuring a spectral reflectance Rmeas($\lambda$) of an object sample to be inspected;
  c) means for determining a peak value Rmeas($\lambda 0$) of said spectral reflectance Rmeas($\lambda$) within a predetermined wavelength range together with a peak wavelength $\lambda 0$ providing said peak value Rmeas($\lambda 0$); and
  d) means for comparing said peak value Rmeas($\lambda 0$) with said reference characteristic Rmax($\lambda 0$) at said peak wavelength $\lambda 0$, to thereby determine residue of said metal layer.

8. The apparatus according to claim 7,
wherein said means for determining comprises:
  means for concluding that said metal layer substantially remains on said dielectric film when said peak value Rmeas($\lambda 0$) is larger than said reference characteristic Rmax($\lambda 0$) at said peak wavelength $\lambda 0$.

9. The apparatus according to claim 7,
wherein said means for determining comprises:
  means for determining a ratio of said peak value Rmeas($\lambda 0$) and said reference characteristic Rmax ($\lambda 0$) at said peak wavelength $\lambda 0$, to evaluate said metal layer remaining on said dielectric film.

10. The apparatus according to claim 7,
wherein said means for determining comprises:
  means for obtaining a spectral reflectance Rmetal($\lambda$) of said metal layer;
  means for obtaining a first value E($\lambda 0$) which is in proportion to logarithm of a first ratio of said spectral reflectance Rmeas($\lambda 0$) of said dielectric film and said spectral reflectance Rmetal($\lambda 0$) at said peak wavelength $\lambda 0$;
  means for obtaining a second value Emax($\lambda 0$) which is in proportion to logarithm of a second ratio of said spectral reflectance Rmax($\lambda 0$) of said dielectric film and said spectral reflectance Rmetal($\lambda 0$) of said metal layer at said peak wavelength $\lambda 0$; and
  means for obtaining a third ratio of said first value E($\lambda 0$) and said second value Emax($\lambda 0$) to evaluate said metal layer remaining on said dielectric film.

11. The apparatus according to claim 10,
wherein said means for determining further comprises:
  a first means for comparing said third ratio with a threshold value to determine whether or not said metal layer substantially remains on said dielectric film;
  a second means for obtaining thickness of a top layer of said optically transparent multi-layers when it is determined that said metal layer substantially remains on said dielectric film; and
  a third means for outputting a value of said thickness of said top layer.

12. The apparatus according to claim 11,
wherein the second means comprises:
  means for obtaining an information representing
    i) a structure of said dielectric film,
    ii) optical constants of respective layers of said dielectric film, and
    iii) a thickness range which is expected to cover said thickness of said top layer; and
  means for calculating said thickness of said top layer in response to said information.

* * * * *